J. J. CARNEY.
AXLE.
APPLICATION FILED NOV. 16, 1910.
1,051,081.
Patented Jan. 21, 1913.
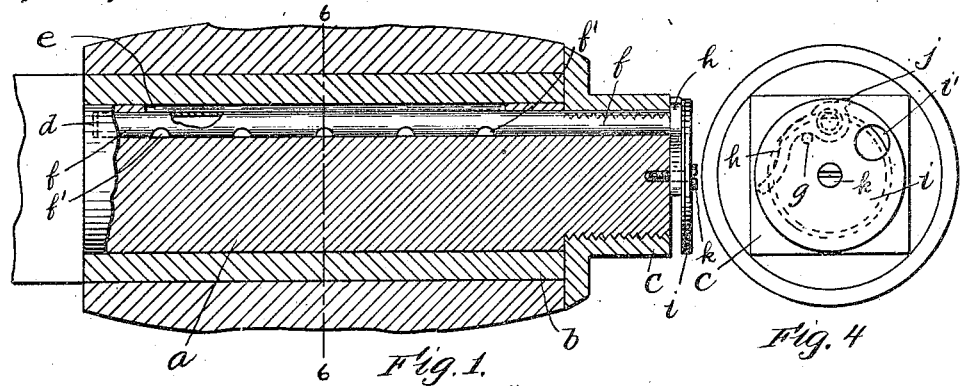
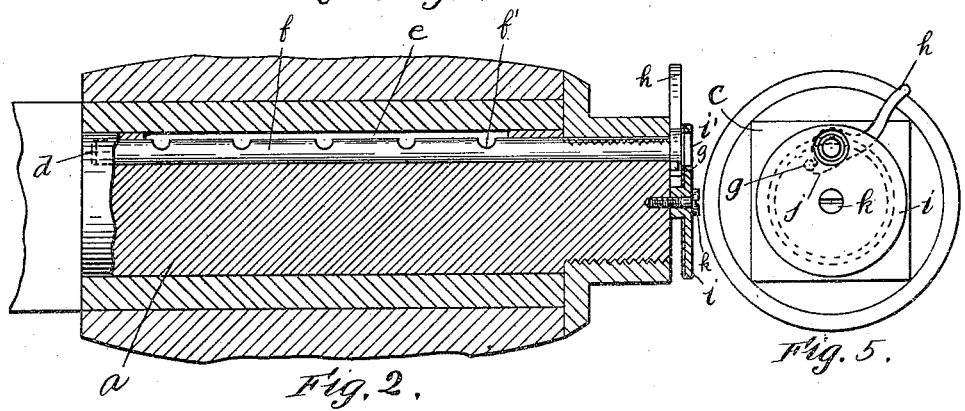
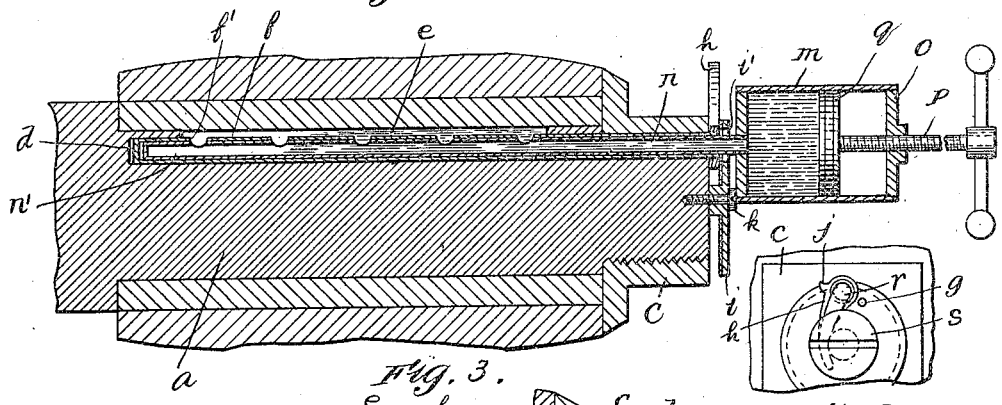
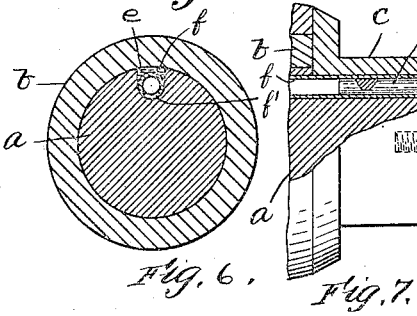
Witnesses:
H. B. Davis.
Cynthia Doyle.
Inventor:
James J. Carney
by Boyd & Hamman
Atty.

UNITED STATES PATENT OFFICE.

JAMES J. CARNEY, OF HAVERHILL, MASSACHUSETTS.

AXLE.

1,051,081.　　　　　Specification of Letters Patent.　　Patented Jan. 21, 1913.

Application filed November 16, 1910. Serial No. 592,713.

*To all whom it may concern:*

Be it known that I, JAMES J. CARNEY, residing at Haverhill, in the county of Essex and State of Massachusetts, have invented an Improvement in Axles, of which the following is a specification.

This invention relates to certain improvements in means for lubricting wagon-axles, and more particularly to means for lubricating an axle without removing the wheel.

The object of my invention is to provide a simple and effective means for lubricating a wagon axle, without removing the wheel, which will enable the axle to be quickly lubricated, and which will also afford a means for retaining a quantity of the lubricant so that lubrication will not be frequently necessary, and which is of such construction that it may be readily and easily applied to any ordinary axle. I accomplish these objects by the means shown in the accompanying drawing, in which, Figures 1, 2 and 3 are central longitudinal sections of a wagon axle provided with my invention, and showing the parts in different positions. Figs. 4 and 5 are end views of the axle showing the parts in different positions. Fig. 6 is a cross section on the line 6—6 of Fig. 1. Figs. 7 and 8 are detail views, in cross section and end elevation, respectively, of a modified form of my invention.

In the drawing $a$ indicates the usual carriage axle on which the box $b$ bearing the hub is rotatably mounted, the hub and box being held in place on the axle by means of a nut $c$, which is threaded thereon in the usual manner, and is open at its outer end, so that the end of the axle is exposed. According to my invention I provide the axle with a bore $d$ which extends longitudinally of the axle from the outer end thereof, nearly to the inner end, and at a short distance below the uppermost portion of the bearing surface thereof, so that it breaks into the bore of the nut $c$ and intersects the inner portion of the surface of the shoulder against which the nut is screwed. Said bore $d$ extends approximately parallel to the surface of the axle and a slot $e$ is cut in the axle from its upper side into the bore $d$ from a point at a short distance from the outer end of the bearing portion to within a short distance of the inner end of the bore $d$. A tube $f$, which acts to form a tubular valve, as hereafter explained, is provided, having a series of apertures $f'$ therein, at one side thereof, said tube being of sufficient length to extend from the outer end of the axle to the inner end of the bore $d$, so that it is mounted in a circular bearing at each end and is adapted to rotate therein. Said tube $f$ is provided with an arm or handle $h$ on its outer end which extends at right angles thereto and by means of which said tube may be rotated. A pin $g$ is mounted in the end of the axle, and is so arranged that when said arm $h$ is swung against it, the apertures in tube $f$ will all open downward and to the bottom of the bore $d$, as shown in Figs. 1 and 4. A lug $j$ is also provided on said tube $f$, which is arranged to engage the pin $g$ when the tube $f$ is rotated to a position in which the apertures $f$ open upward into the slot $e$, as shown in Figs. 2, 3 and 5.

To close the outer end of the tube $f$ I may employ several methods, two of which are shown in the drawing. In Figs. 1 to 5 inclusive, I illustrate a rubber faced washer $i$, which is secured to the end of the axle by a screw $k$ arranged concentrically thereof, said washer being of sufficient diameter to engage the open end of the tube $f$, and close the same, and also hold it in position. An aperture $i'$ is provided in the washer which is arranged so that by turning the washer to the position of Fig. 5, it may register with the end of the tube. Said washer also acts as a protector or cover for the arm $h$ when in its normal position, as shown in Fig. 1.

In connection with the above described device I provide a filling device, which comprises a cylinder $m$ having one end closed and having a discharge tube $n$ connected to said closed end, said tube being adapted to be inserted into, and to fit closely in the tube $f$. Said tube $n$ is closed at its opposite end and is provided with a row of apertures $n'$ in one side thereof, which are arranged to register with the apertures $f'$ of the tube $f$, when the tube $n$ is inserted in the tube $f$, so that its inner end extends approximately to the inner end of tube $f$. The cylinder $m$ is provided with a removable filling cap $o$ and a piston-rod $p$ is threaded in said cap and is provided with a piston $q$, so that by rotating said rod the lubricant which is in the cylinder $m$ may be forced into and through the tube $n$ and out through its apertures $n'$.

Under normal conditions the lever $h$ will be held in the position of Fig. 4, resting against the stop $g$, and the washer $i$ will be held against the end of the tube $f$ closing the end thereof. When it is desired to lubricate the bearing the arm $h$ is moved to the position of Fig. 5, so that the lug $j$ engages the pin $g$ and the apertures $f'$ will face upwardly. The washer $i$ is loosened and turned so that its aperture $i'$ will be in register with the end of the tube $f$, and then the tube $n$ on the end of the pump is slid into the tube $f$, until it comes to a stop, in which position the apertures in the tube $n$ will be in register with the apertures $f'$ in the tube $f$, as shown in Fig. 3. Then the piston $q$ is screwed toward the end of the cylinder to which the tube $n$ is connected, forcing the lubricant, preferably in the form of a hard grease, contained in the cylinder through the tube and out through the apertures $n'$ and $f'$ into the slot $e$, or space between the tube $f$ and axle-box and also into the space between the axle and the axle-box. The pump tube $n$ is then withdrawn and the arm $h$ is moved back to the initial position, rotating the tube $f$ so that communication between the bearing surface and the interior of the tube is cut off, the tube thus acting as a valve. It will be observed that none of the lubricant is actually discharged into tube $f$, or left in it when tube $n$ is removed. In this way the axle is thoroughly lubricated, and a supply of lubricant is left in the space between the upper side of the tube $f$ and the axle-box, as indicated in Fig. 6, which will be applied to the bearing surfaces, as needed. I have found, in practice, that a deep groove filled with a lubricant of the nature which I preferably employ, is of no more practical value than a shallow groove, for the reason that only the lubricant which is held close to the bearing surface, is applied to the bearing in either case. After the pump tube $n$ has been withdrawn, and the arm $h$ has been thrown back, to the position of Fig. 4, the washer $i$ is again turned so that its aperture is out of register with the tube $f$ and is then tightened against the end of the tube.

In practice a small amount of lubricant will work out between the tube $f$ and the bore $d$, which contains it, to the face of the nut, and from this point will escape between the face of the nut and the end of the axle-box and act to lubricate the bearing surfaces therebetween. As the thrust on these surfaces is at times, considerable, lubrication thereof is very desirable.

As, in some instances, it is desirable to remove the nut, the disk $i$ is open to the objection that it must be removed in order that the nut may be removed. To obviate this objection and yet to provide means for closing the end of the tube $f$, and also to provide means for holding and protecting the lever $h$, I may also employ the construction shown in Figs. 7 and 8, in which a plug $t$, having an arm $r$ on its end, is provided, said plug being adapted to fit tightly in the outer end of the tube $f$, and said arm being adapted to be held against the outer side of the arm $h$ and between said arm and the head of a stop screw $s$, which is mounted in the end of the axle, the diameter of the head of said screw being sufficient to cover the end portions of the arms $h$ and $r$, but not extending beyond the periphery of the threaded portion of the axle, so that the nut may be removed without removing the screw $s$. In lubricating the axle, when this construction is employed, the arm $h$ is moved to a position corresponding to that of Fig. 5, and the arm $r$ is swung from behind the head of the screw and is then drawn out of the tube $f$, so that the tube $n$ of the pump may be inserted to lubricate the bearing, as already described. The plug $t$, when in position, prevents the entrance of dust or dirt into the tube $f$ and also prevents leakage of the lubricant from the tube, in case there should be any leakage through its apertures $f'$.

The above described device may be readily applied to any ordinary wagon axle, as will be apparent, and when applied enables the axle to be quickly and easily lubricated without removing the nut or wheel.

I claim:—

1. A vehicle axle having a longitudinal bore leading from its outer end and opening to the bearing surface at an intermediate point therein, a valve tube fitted in said bore and having a port in one side, said tube being movable to carry said port into and out of register with said opening, to open and close communication between its interior and the bearing, in combination with a filling tube telescopically insertible in said valve tube from the outer end thereof and having a side port arranged to be brought into position of register with the port of said valve tube when the latter is in position of register with said opening, and means for forcing a lubricant from said filling tube, through said ports and said opening, while said tubes are held in said positions of register, substantially as described.

2. A vehicle axle having a longitudinal bore leading from its outer end and opening to the bearing surface at an intermediate point therein, a valve tube fitted in said bore and having a port in one side, said tube being rotatable to carry said port into and out of register with said opening, to open and close communication between its interior and the bearing, in combination with a filling tube telescopically insertible in said valve tube from the outer end thereof and having a side port arranged to be brought into position of register with the port of said valve tube when the latter is in position of register with said opening, and means for forcing a lubricant from said filling tube, through said ports and said opening, while said tubes are held in said positions of register, substantially as described.

3. A vehicle axle having a longitudinal bore leading from its end and opening to the bearing surface at a distance from the end, and a valve tube for said bore fitted and rotatable therein, said tube having a port in one side thereof arranged to permit communication between the bearing and the interior of the tube in certain positions of rotation of the latter, an arm on the outer end of said tube for rotating the same, and means for limiting the movement of said arm at a predetermined point, substantially as described.

4. A vehicle axle having a longitudinal bore leading from its end and opening to the bearing surface at a distance from the end, and a valve tube for said bore fitted and rotatable therein, said tube having a port in one side thereof arranged to permit communication between the bearing and the interior of the tube in certain positions of rotation of the latter, an arm on the outer end of said tube for rotating the same, and means for limiting the movement of said arm at directly opposite positions to hold the tube both in its open and closed position, substantially as described.

In testimony whereof, I have signed my name to this specification, in the presence of two subscribing witnesses.

JAMES J. CARNEY.

Witnesses:
  L. H. HARRIMAN,
  H. B. DAVIS.